US008552365B2

(12) United States Patent
Wouters et al.

(10) Patent No.: US 8,552,365 B2
(45) Date of Patent: Oct. 8, 2013

(54) ION POPULATION CONTROL IN A MASS SPECTROMETER HAVING MASS-SELECTIVE TRANSFER OPTICS

(75) Inventors: Eloy R. Wouters, San Jose, CA (US); Maurizio A. Splendore, Walnut Creek, CA (US); Jae C. Schwartz, Gilroy, CA (US)

(73) Assignee: Thermo Finnigan LLC, San Jose, CA (US)

( * ) Notice: Subject to any disclaimer, the term of this patent is extended or adjusted under 35 U.S.C. 154(b) by 457 days.

(21) Appl. No.: 12/777,088

(22) Filed: May 10, 2010

(65) Prior Publication Data

US 2010/0282957 A1 Nov. 11, 2010

Related U.S. Application Data

(60) Provisional application No. 61/177,093, filed on May 11, 2009.

(51) Int. Cl.
*B01D 59/44* (2006.01)
*H01J 49/36* (2006.01)

(52) U.S. Cl.
USPC ............ 250/282; 250/281; 250/288; 250/293

(58) Field of Classification Search
USPC .......................... 250/281, 282, 292, 283, 288
See application file for complete search history.

(56) References Cited

U.S. PATENT DOCUMENTS

| | | | | |
|---|---|---|---|---|
| 4,540,884 | A * | 9/1985 | Stafford et al. | 250/282 |
| 5,572,022 | A | 11/1996 | Schwartz et al. | |
| 5,572,025 | A | 11/1996 | Cotter et al. | |
| 6,107,628 | A * | 8/2000 | Smith et al. | 250/292 |
| 6,787,760 | B2 * | 9/2004 | Belov et al. | 250/282 |
| 6,891,153 | B2 * | 5/2005 | Bateman et al. | 250/281 |
| 6,987,261 | B2 * | 1/2006 | Horning et al. | 250/282 |
| 7,157,698 | B2 * | 1/2007 | Makarov et al. | 250/281 |
| 7,312,441 | B2 | 12/2007 | Land et al. | |
| 7,514,673 | B2 | 4/2009 | Senko et al. | |
| 7,638,763 | B2 | 12/2009 | Guckenberger et al. | |
| 2002/0030159 | A1 * | 3/2002 | Chernushevich et al. | 250/287 |
| 2003/0042415 | A1 * | 3/2003 | Hager | 250/282 |
| 2003/0122070 | A1 * | 7/2003 | Chang et al. | 250/292 |
| 2004/0094709 | A1 * | 5/2004 | Bateman | 250/292 |
| 2004/0217272 | A1 * | 11/2004 | Horning et al. | 250/282 |
| 2005/0118724 | A1 * | 6/2005 | Bateman et al. | 436/173 |
| 2005/0199796 | A1 * | 9/2005 | Currell | 250/281 |
| 2006/0016976 | A1 * | 1/2006 | Land et al. | 250/282 |
| 2006/0163468 | A1 * | 7/2006 | Wells et al. | 250/281 |
| 2007/0278399 | A1 * | 12/2007 | Kim et al. | 250/288 |
| 2008/0210860 | A1 * | 9/2008 | Kovtoun | 250/283 |
| 2009/0045062 | A1 * | 2/2009 | Senko et al. | 204/643 |
| 2009/0072136 | A1 | 3/2009 | Pringle et al. | |
| 2010/0019144 | A1 * | 1/2010 | Schwartz et al. | 250/283 |

* cited by examiner

*Primary Examiner* — David A Vanore
*Assistant Examiner* — Brooke Purinton
(74) *Attorney, Agent, or Firm* — Thomas F. Cooney

(57) ABSTRACT

Methods for operating a mass spectrometer having at least one component having mass-dependent transmission, comprising: injecting a first sample of ions having a first mass range into an ion accumulator for a first injection time under first operating conditions suitable for optimizing transmission of ions of the first range; acquiring a full-scan mass spectrum of the first sample of ions; selecting ion species having a second mass range different than the first range; calculating a second injection time, the second injection time suitable for injecting a population of the selected ion species into the ion accumulator under second operating conditions suitable for optimizing transmission of ions of the second range; injecting a second sample of ions having the selected ion species into the ion accumulator for the second injection time under the second operating conditions; and acquiring a mass spectrum of ions derived from the selected ion species.

20 Claims, 7 Drawing Sheets

ION POPULATION CONTROL IN A MASS SPECTROMETER HAVING MASS-SELECTIVE TRANSFER OPTICS

TECHNICAL FIELD

The present invention relates generally to ion trap mass spectrometers, and more particularly to methods for optimizing the ion population in an ion trap.

BACKGROUND OF THE INVENTION

Ion trap mass spectrometers are well known in the art for analysis of a wide variety of substances. When operating an ion trap, it is desirable to maintain the number of ion charges in the trap (the number of ions times the charge/ion) at or near a target value in order to optimize trap performance. Overfilling the ion trap results in space charge effects that adversely affect resolution and mass accuracy; conversely, under-filling the ion trap reduces sensitivity. A number of approaches have been described in the prior art for optimizing ion population. The "automatic gain control" (AGC) method discussed in U.S. Pat. No. 5,572,022 (incorporated herein by reference) involves calculation of the fill time (also referred to as the injection time) of an ion trap based on the ion flux over a mass range of interest so that the ion trap is filled with a fixed number of charges that approximates the number that produces optimal trap performance. The ion flux is determined by performing a "pre-scan" in which the ion trap is filled over a short predetermined injection time, and accumulated ions are then scanned out of the trap to measure the resultant total number of charges. From this measured ion flux, the appropriate injection time can be calculated for the actual analytical scan. To retain the quantitative capability of the system, the resultant intensities can be appropriately scaled by accounting for the specific injection used to acquire each spectrum.

Ion traps, as well as other mass analyzers, may also be operated in a so-called "data-dependent" mode, in which an analytical scan of interest over an extended mass-to-charge (m/z) range (a full scan) is immediately followed by one or more MS/MS or $MS^n$ experiments on ions selected and isolated based on the full-scan results, e.g., on the N most intense peaks in the full-scan mass spectrum. The terms "MS/MS" and "$MS^n$" refer to mass analysis experiments in which a particular precursor ion is selected and isolated at the first stage of analysis or in a first mass analyzer (MS-1), the precursor ions are subjected to fragmentation (e.g. in a collision cell, which may also function as an ion accumulator), and the resulting fragment (product) ions are analyzed in a second stage of analysis or in a second mass analyzer (MS-2). The method can be extended to provide fragmentation of a selected fragment, and so on, with analysis of the resulting fragments for each generation. This is typically referred to an $MS^n$ spectrometry, with the superscript "n" indicating the number of steps of mass analysis and the number of generations of ions, and is a somewhat unique capability for trapping types of mass analyzers. Accordingly, $MS^2$ corresponds to two stages of mass analysis with two generations of ions analyzed (precursor and products).

An important parameter in the operation of mass spectrometers is the cycle time, which is how long it takes to perform a particular scan type and is often expressed as the number of mass scan events that can be acquired in a one-second time window. It can be readily concluded that the need to conduct a pre-scan before each data-dependent experiment adversely impacts the cycle time of the ion trap.

U.S. Pat. No. 7,312,441 (also incorporated by reference) describes a method, referred to as "predictive AGC". In predictive AGC, the intensity of a peak in the full scan spectrum corresponding to an ion of interest and the ion fill time for the full scan are used to calculate the fill time required for the data-dependent scan on the ion of interest. A problem may arise with the practice of predictive AGC when ion injections for the full scan and data-dependent scan are performed under different injection conditions. As used herein, the term "injection conditions" refers to any parameter or combination of parameters that affects the efficiency of transmission of ions from the ion source to the ion trap and/or the efficiency of trapping of ions within the ion trap, including but not limited to the values of voltages applied to various ion optical elements and parameters defining injection voltage waveforms applied to the electrodes of the ion trap itself Generally, for a given set of parameters, the efficiency of ion injection can be dependent on the m/z of a particular ion species; for example, ions having a relatively large m/z may be injected at greater efficiency relative to ions of lower m/z or vice versa. It may be beneficial to select the ion injection parameters based on objectives for a given type of experiment. For example, it is generally desirable to obtain a substantially flat (m/z invariant) injection curve for full-scan experiments so that the mass spectrum accurately reflects the relative quantities of the wide m/z range of ions produced in the ion source, whereas for data-dependent experiments it may be desirable to optimize transmission just for the precursor ion species of interest.

U.S. Patent Application Publication No. US2009/0045062 (also incorporated herein by reference) provides an illustration of how different injection conditions may be utilized for filling ion traps for full-scan and data-dependent experiments. This publication describes the operation of a stacked ring ion guide (SRIG) ion transport device, which assists in the transport of analyte ions in the low vacuum region of the mass spectrometer. The relevant injection parameter is the amplitude of the RF voltage applied to the stack of ring electrodes. During a full-scan experiment, the RF voltage amplitude is stepped over, for instance, three values during the injection period in order to obtain a substantially flat aggregate transmission curve in the m/z range of interest. In contrast, for data-dependent experiments, the RF voltage is set to maximize the transmission efficiency for the selected precursor ion species. If the predictive AGC method is employed in these circumstances, the data-dependent experiment injection time calculated based on the intensity of the selected ion peak in the full-scan mass spectrum and the full-scan injection time will be excessive (owing to the differences in the transmission efficiencies of the selected ion during the full-scan and data-dependent experiments), resulting in space charging of the ion trap and the consequential detrimental effects.

As a result of the foregoing discussions, it is clear that there is a need in the art for methods which are able to compensate for mass spectrometer systems having ion transfer optics whose transmission efficiency is m/z-dependent and to correct the injection times calculated for data-dependent MS/MS or $MS^n$ experiments in which the precursor ion intensities in the preceding full scan are used to calculate the injection times for the subsequent MS/MS or $MS^n$ scans. The previously-described AGC and predictive AGC techniques are not fully adequate for such situations. Embodiments in accordance with the present teachings address the foregoing deficiencies of the predictive AGC technique. The invention is illustrated herein in connection with its application to operation of a mass spectrometer having a SRIG ion transport device. However, the principles of the invention may be extended to any ion trap mass spectrometer having mass-selective ion optics in the ion path and in which injection conditions are separately optimized or selected for full-scan and subsequent data-dependent experiments. Without limitation, the technique may be employed for quadrupole ion traps (QITs) as well as other types of trapping mass analyzers, such as FTICR analyzers and Orbitraps or, indeed, for any ion optical elements having mass dependent transmission efficiency.

SUMMARY

According to a first aspect of the invention, a method is provided for operating a mass spectrometer having at least one component through which ion transmission is dependent on ionic mass-to-charge-ratio, the method characterized by: (a) injecting a first sample of ions having a first range of mass-to-charge ratios into an ion accumulator of the mass spectrometer for a first injection time under first operating conditions, the first operating conditions suitable for optimizing transmission through the at least one component of ions of the first range of mass-to-charge ratios; (b) acquiring a full-scan mass spectrum of the first sample of ions; (c) selecting, based on the full scan mass spectrum, ion species having a second range of mass-to-charge ratios, the second range different than the first range; (d) calculating a second injection time, the second injection time suitable for injecting a population of the selected ion species into the ion accumulator under second operating conditions, the second operating conditions suitable for optimizing transmission through the at least one component of ions of the second range of mass-to-charge ratios; (e) injecting a second sample of ions having the selected ion species into the ion accumulator for the second injection time under the second operating conditions; and (f) acquiring a mass spectrum of ions derived from the selected ion species in the mass spectrometer.

As used in this specification, ions "derived from" selected ions include just the selected ions themselves as well as ions produced by subsequent manipulation of those ions (such as fragmentation or filtering for example). Thus, the step of acquiring a mass spectrum of ions derived from the selected ion species in the mass spectrometer may include MS/MS or $MS^n$ analysis.

In various embodiments, either the step (a) of injecting a first sample of ions into the mass spectrometer or the step (e) of injecting a second sample of ions having the selected ion species into the mass spectrometer may comprise transporting ions through a stacked-ring-ion-guide (SRIG) ion transport device. If ions are transported through a SRIG ion transport device, a plurality of RF voltage amplitudes may be applied to ring electrodes of the SRIG ion transport device during the injecting so as to optimize transmission of a first, possibly relatively wide m/z range of ions therethrough. Such plurality of RF voltage amplitudes may include a first amplitude, $A_1$, calculated as $A_1=K\sqrt{(m/z)_{low}}$ and a second amplitude, $A_3$, calculated as $A_3=K\sqrt{(m/z)_{high}}$, wherein $(m/z)_{low}$ and $(m/z)_{high}$ are, respectively, low and high ionic mass-to-charge ratios and K is a user-supplied or automatically selected scaling parameter such that $(0<K\leq 10)$. The value of K may be further limited to values between 3 and 7. Further, the plurality of RF voltage amplitudes may include an additional amplitude, $A_2$, calculated as $A_2=K\sqrt{(m/z)_{low}+c[(m/z)_{high}-(m/z)_{low}]}$ wherein c is a constant such that $(0\leq c\leq 1)$. If a different, possibly relatively narrow range or single m/z of ions is transported through a SRIG ion transport device, a single RF voltage amplitude may be applied to the ring electrodes of the SRIG ion transport device during the injecting so as to optimize transmission of ions therethrough. Such single RF voltage amplitudes may be calculated as $A_S=K\sqrt{(m/z)_S}$, wherein $(m/z)_S$ is the mass-to-charge ratio of a selected ion species. In various embodiments, the step (d) of calculating a second injection time may incorporate a pre-determined calibration factor that varies according to $(m/z)_S$, the mass-to-charge ratio of a selected ion species. If ions are transported through a SRIG ion transport device, the pre-determined calibration factor may further vary according to the scaling parameter, K.

According to a second aspect of the invention, a mass spectrometer system is provided, the mass spectrometer system characterized by: (i) an ion source for providing ions; (ii) an ion accumulator for storing, fragmenting or analyzing ions provided by the ion source, the ion accumulator having an ion detector; (iii) an ion transport device having mass-to-charge-ratio-dependent transmission characteristics disposed between the ion source and the ion accumulator for transporting ions from the ion source to the ion accumulator; and (iv) an electronic processing and control unit electronically coupled to the ion accumulator and the ion transport device, the electronic processing and control unit comprising instructions operable to: (a) cause the ion transport device to inject a first sample of ions having a first range of mass-to-charge ratios into the ion accumulator for a first injection time under first operating conditions, the first operating conditions suitable for optimizing transmission through the ion transport device of ions of the first range of mass-to-charge ratios; (b) cause the ion accumulator and detector to acquire a full-scan mass spectrum of the first sample of ions; (c) select, based on the full scan mass spectrum, ion species having a second range of mass-to-charge ratios, the second range different than the first range; (d) calculate a second injection time, the second injection time suitable for injecting a population of the selected ion species into the ion accumulator under second operating conditions, the second operating conditions suitable for optimizing transmission through the ion transport device of ions of the second range of mass-to-charge ratios; (e) cause the ion transport device to inject a second sample of ions having the selected ion species into the ion accumulator for the second injection time under the second operating conditions; and (f) cause the ion accumulator and detector to acquire a mass spectrum of ions derived from the selected ion species in the mass spectrometer.

BRIEF DESCRIPTION OF THE DRAWINGS

The above noted and various other aspects of the present invention will become apparent from the following description which is given by way of example only and with reference to the accompanying drawings, not drawn to scale, in which.

DETAILED DESCRIPTION

Figure 1A:
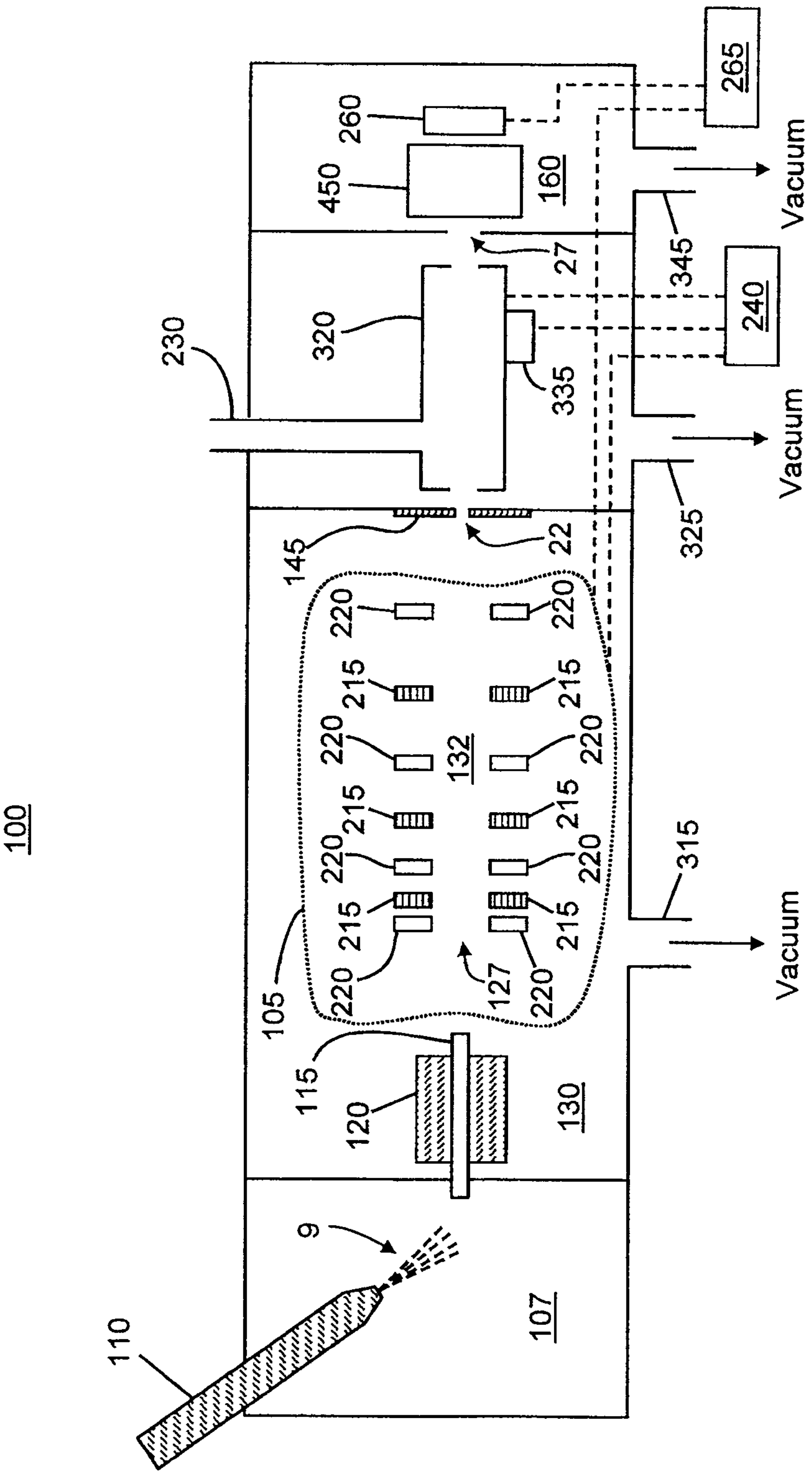
FIG. 1A is a schematic depiction of a first mass spectrometer system in conjunction with which various embodiments in accordance with the present teachings may be practiced.

Unless otherwise defined, all technical and scientific terms used herein have the meaning commonly understood by one of ordinary skill in the art to which this invention belongs. All publications, patent applications, patents, and other references mentioned herein are incorporated by reference in their entirety. In case of conflict, the present specification, including definitions, will control. The disclosed materials, methods, and examples are illustrative only and not intended to be limiting. Persons having ordinary skill in the art will appreciate that methods and materials similar or equivalent to those described herein can be used to practice the invention.

Exemplary embodiments of the invention will now be described and explained in more detail with reference to the embodiments illustrated in the drawings. The features that can be derived from the description and the drawings may be used in other embodiments of the invention either individually or in any desired combination.

FIG. 1A is a schematic depiction of a first mass spectrometer system 100 in conjunction with which various embodiments of the present teachings may be practiced. Analyte ions may be formed by the electrospray technique by introducing a sample comprising a plume 9 charged ions and droplets into an ionization chamber 107 via an electrospray probe 110. For an ion source that utilizes the electrospray technique, ionization chamber 107 will generally be maintained at or near atmospheric pressure. Although an electrospray ion source is illustrated, the ion source may comprise any conventional continuous or pulsed source, such as a thermal spray source, an electron impact source, a chemical ionization source, APCI or MALDI source, which generates ions from material received from, for example, a liquid chromatograph (not shown).

The analyte ions, together with background gas and partially desolvated droplets, flow into the inlet end of a conventional ion transfer tube 115 (e.g., a narrow-bore capillary tube) and traverse the length of the tube under the influence of a pressure gradient. Analyte ion transfer tube 115 is preferably held in good thermal contact with a heating block 120. The analyte ions emerge from the outlet end of ion transfer tube 115, which opens to an entrance 127 of an ion transport device 105 located within a first low vacuum chamber 130. As indicated by the arrow, chamber 130 is evacuated to a low vacuum pressure by, for example, a mechanical pump or equivalent through vacuum port 315. Under typical operating conditions, the pressure within the low vacuum chamber 130 will be in the range of 1-10 Torr (approximately 1-10 millibar), but it is believed that the ion transport device 105 may be successfully operated over a broad range of low vacuum and near-atmospheric pressures, e.g., between 0.1 millibar and 1 bar.

After being constricted into a narrow beam by the ion transport device 105 (as described in greater detail following), the ions are directed through aperture 22 of extraction lens 145 so as to exit the first low pressure chamber 130 and enter into an ion accumulator 320, which is likewise evacuated, but to a lower pressure than the pressure in the first low pressure chamber 130, also by a second vacuum port 325. The ion accumulator 320 functions to accumulate ions derived from the ions generated by ion source 110. The ion accumulator 320 can be, for example, in the form of a multipole ion guide, such as an RF quadrupole ion trap or a RF linear multipole ion trap. Where ion accumulator 320 is an RF quadrupole ion trap, the range and efficiency of the ion mass to charge ratios captured in the RF quadrupole ion trap may be controlled by, for example, selecting the RF and DC voltages used to generate the quadrupole field, or applying supplementary fields, e.g. broadband waveforms. A collision or damping gas such as helium, nitrogen, or argon, for example, can be introduced via inlet 230 into the ion accumulator 320. The neutral gas provides for stabilization of the ions accumulated in the ion accumulator and can provide target molecules for collisions with ions so as to cause collision-induced fragmentation of the ions, when desired.

The ion accumulator 320 may be configured to radially eject the accumulated ions towards an ion detector 335, which is electronically coupled to an associated electronics/processing unit 240. The detector 335 detects the ejected ions. Sample detector 335 can be any conventional detector that can be used to detect ions ejected from ion accumulator 320.

Ion accumulator 320 may also be configured to eject ions axially towards a subsequent mass analyzer 450 through aperture 27 (optionally passing through ion transfer optics which are not shown) where the ions can be analyzed. The ions are detected by the ion detector 260 and its associated electronics/processing unit 265. The mass analyzer 450 may comprise an RF quadrupole ion trap mass analyzer, a Fourier-transform ion cyclotron resonance (FT-ICR) mass analyzer, an Orbitrap or other type of electrostatic trap mass analyzer or a time-of-flight (TOF) mass analyzer. The analyzer is housed within a high vacuum chamber 160 that is evacuated by vacuum port 345. In alternative configurations, ions that are ejected axially from the ion accumulator 320 may be detected directly by an ion detector (260) within the high vacuum chamber 160. As one non-limiting example, the mass analyzer 450 may comprise a quadrupole mass filter which is operated so as to transmit all ions that are axially ejected from the ion accumulator 320 through to the detector 260.

Figure 1B:
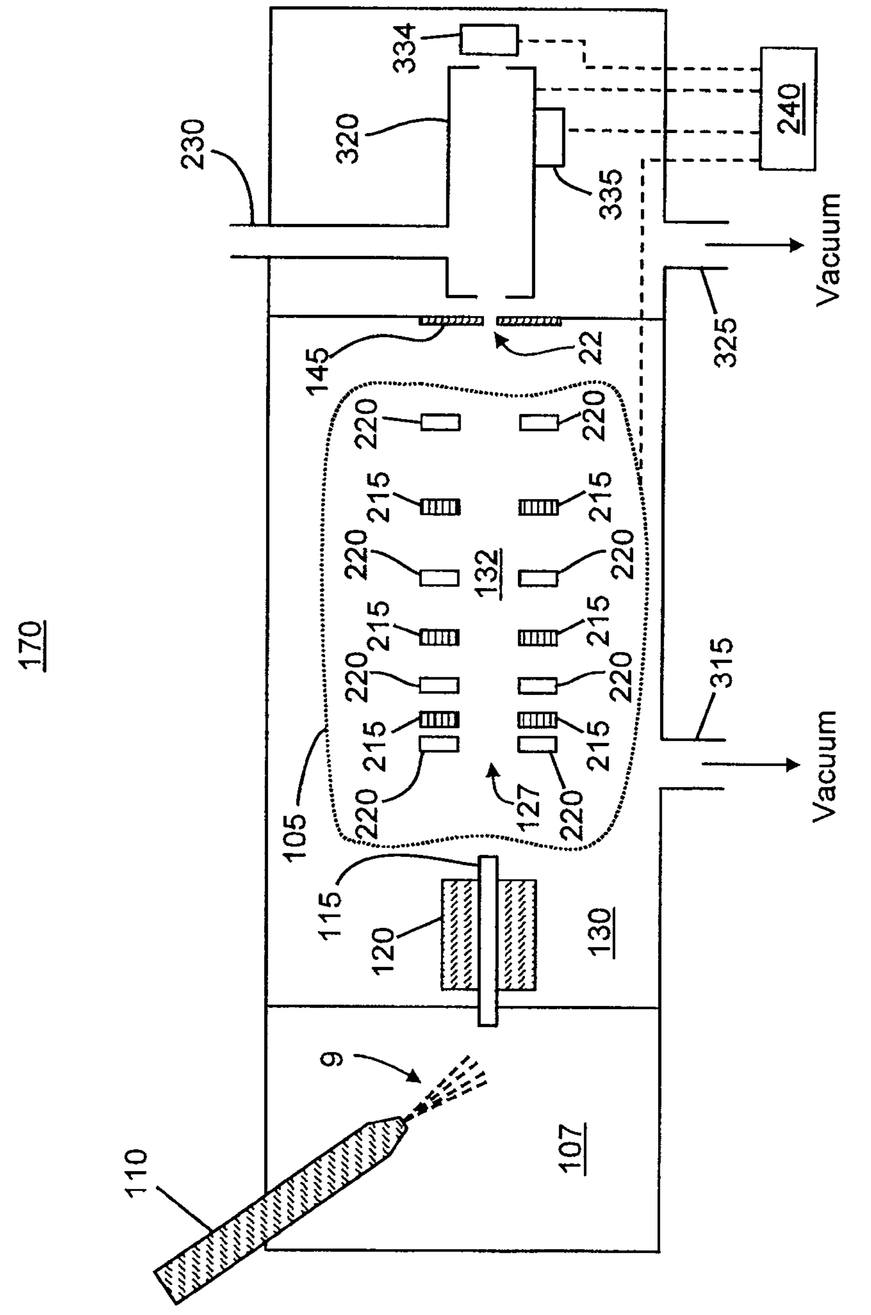
FIG. 1B is a schematic depiction of a second mass spectrometer system in conjunction with which various embodiments in accordance with the present teachings may be practiced.

FIG. 1B is a schematic depiction of a second mass spectrometer system 170 in conjunction with which various embodiments of the invention may be practiced. FIG. 1B is similar in almost every respect to FIG. 1A, except that no subsequent mass analyzer is illustrated. Instead, the ion accumulator 320 of the mass spectrometer system 170 is such that it functions as both an accumulator and a mass analyzer. Once again, the ion accumulator may be a substantially quadrupolar or multipolar ion trap, a linear ion trap, an Orbitrap or other electrostatic trap mass analyzer, a TOF or an FT/ICR. In various alternative configurations, ions may be ejected radially from the ion accumulator 320 so as to be detected by ion detector 335 or may be ejected axially from the ion accumulator 320 so as to be detected by ion detector 334.

Either the electronics/processing unit 240 or the electronics/processing unit 265, or another external computer or processor may perform control operations so as to control the operation of the components of either the mass spectrometer system 100 (FIG. 1A) or the mass spectrometer system 170 (FIG. 1B). Such control operations may include controlling electrodes of the ion accumulator or of the mass analyzer 450 so as to selectively store, eject or analyze ions. Such control operations may also include controlling introduction of collision or damping gas through the inlet 230 or controlling voltages on extraction lens 145 or on electrodes of other ion optics (not shown) so as to cause collision-induced fragmentation of selected ions within the ion accumulator. Such control operations could also include controlling operation of the SRIG ion transport device 105 so as to control the timing or efficiency of transport of ions from the ion source 110 to the ion accumulator 320. Such control operations may include controlling timing and amplitudes of voltages applied to electrodes of the SRIG ion transport apparatus 105 and may be performed so as to implement, perhaps automatically, the methods described in the following discussions. Control lines, for carrying control signals for implementing such control operations, are indicated schematically in non-limiting fashion in FIGS. 1A and 1B by dashed lines extending from the electronics/processing units 240, 265 to other system components.

Figure 2:
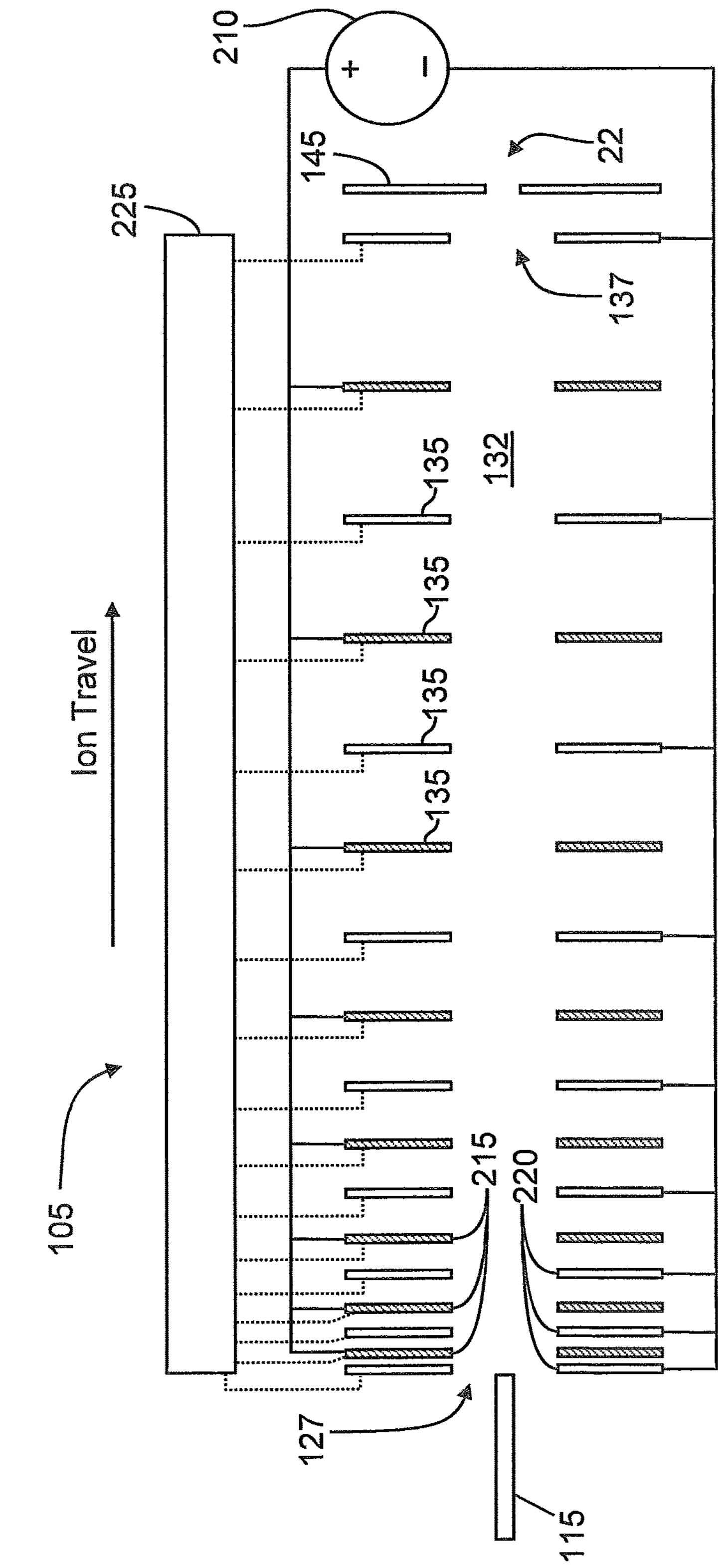
FIG. 2 (Prior Art)
FIG. 2 is a cross-sectional depiction of a stacked-ring ion guide (SRIG) ion transport device used in the mass spectrometer systems of FIG. 1.
Figure 3:
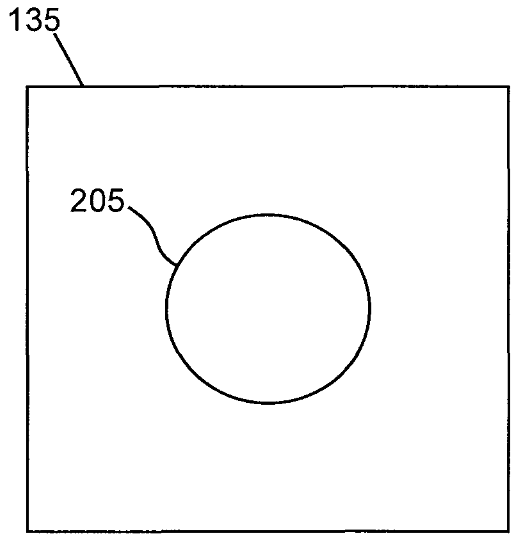
FIG. 3 is a diagram of a single ring electrode of the SRIG ion transport device of FIG. 2.

FIG. 2 depicts (in rough cross-sectional view) details of an ion transport device 105 as taught in U.S. Patent Application Publication No. US2009/0045062. Ion transport device 105 is formed from a plurality of generally planar electrodes 135, comprising a set of first electrodes 215 and a set of second electrodes 220, arranged in longitudinally spaced-apart relation (as used herein, the term "longitudinally" denotes the axis defined by the overall movement of ions along ion channel 132). Devices of this general construction are sometimes referred to in the mass spectrometry art as "stacked-ring" ion guides. An individual electrode 135 is illustrated in FIG. 3. FIG. 3 illustrates that each electrode 135 is adapted with an aperture 205 through which ions may pass. The apertures collectively define an ion channel 132 (see FIGS. 1, 2), which may be straight or curved, depending on the lateral alignment of the apertures. To improve manufacturability and reduce cost, all of the electrodes 135 may have identically sized apertures 205. An oscillatory (e.g., radio-frequency) voltage source 210 applies oscillatory voltages to electrodes 135 to thereby generate a field that radially confines ions within the ion channel 132. According to a preferred embodiment, each electrode 135 receives an oscillatory voltage that is equal in amplitude and frequency but opposite in phase to the oscillatory voltage applied to the adjacent electrodes. As depicted, electrodes 135 may be divided into a plurality of first electrodes 215 interleaved with a plurality of second electrodes 220, with the first electrodes 215 receiving an oscillatory voltage that is opposite in phase with respect to the oscillatory voltage applied to the second electrodes 220. In this regard, note that the first electrodes 215 and the second electrodes 220 are respectively electrically connected to opposite terminals of the oscillatory voltage source 210. In a typical implementation, the frequency and amplitude of the applied oscillatory voltages are 0.5-1 MHz and 50-400 $V_{p-p}$ (peak-to-peak), the required amplitude being strongly dependent on frequency.

To create a tapered electric field that focuses the ions to a narrow beam proximate the exit 137 of the ion transport device 105, the longitudinal spacing of electrodes 135 may increase in the direction of ion travel. It is known in the art (see, e.g., U.S. Pat. No. 5,572,035 to Franzen) that the radial penetration of an oscillatory field in a stacked ring ion guide is proportional to the inter-electrode spacing. Near entrance 127, electrodes 135 are relatively closely spaced, which provides limited radial field penetration, thereby producing a wide field-free region around the longitudinal axis. This condition promotes high efficiency of acceptance of ions flowing from the ion transfer tube 115 into the ion channel 132. Furthermore, the close spacing of electrodes near entrance 127 produces a strongly reflective surface and shallow pseudo-potential wells that do not trap ions of a diffuse ion cloud. In contrast, electrodes 135 positioned near exit 137 are relatively widely spaced, which provides effective focusing of ions (due to the greater radial oscillatory field penetration and narrowing of the field-free region) to the central longitudinal axis. It is believed that the relatively wide inter-electrode spacing near device exit 137 will not cause significant ion loss, because ions are cooled toward the central axis as they travel along ion channel 132. In one exemplary implementation of ion transport device 105, the longitudinal inter-electrode spacing (center-to center) varies from 1 mm at device entrance 127 to 5 mm at device exit 137. A longitudinal DC field may be created within the ion channel 132 by providing a DC voltage source 225 that applies a set of DC voltages to electrodes 135.

In an alternative embodiment of an ion transport device, the electrodes may be regularly spaced along the longitudinal axis. To generate the tapered radial field, in such an alternative embodiment, that promotes high ion acceptance efficiency at the entrance of the ion transport device as well as tight focusing of the ion beam at the device exit, the amplitude of oscillatory voltages applied to electrodes increases in the direction of ion travel.

It has been observed that for an ion transport device having progressively increasing inter-electrode spacing in the direction of ion travel, such as the device depicted in FIG. 2 and described above, the amplitude of the applied RF voltage at which ion transmission efficiency is maximized will increase with the mass-to-charge ratio (m/z) of the transmitted ions. In other words, for a given value of applied RF voltage, the ion transmission efficiency of the device may be m/z-dependent, such that ions having a certain m/z value may be transmitted more or less efficiently relative to ions having different values of mass-to-charge ratio.

For mass spectrometer instruments employing "pulsed" mass analyzers such as quadrupole ion traps (or instruments that use an intermediate ion store upstream of the mass analyzer), in order to transmit a wide range of m/z more uniformly to the mass analyzer, it may be useful to vary the amplitude of the RF voltage applied to the electrodes of the ion transport device over the injection period during which ions are accumulated within an ion accumulator, mass analyzer or intermediate store. In an illustrative example, a value of RF amplitude may be applied at the beginning of the injection period that maximizes transmission for ions having relatively low m/z's. The RF voltage amplitude is then varied over the injection period (typically in a stepped or continuous fashion, but a more complex modulation of the voltage may also be utilized) so that transmission efficiency is increased for ions having progressively higher m/z's.

Figure 4A:
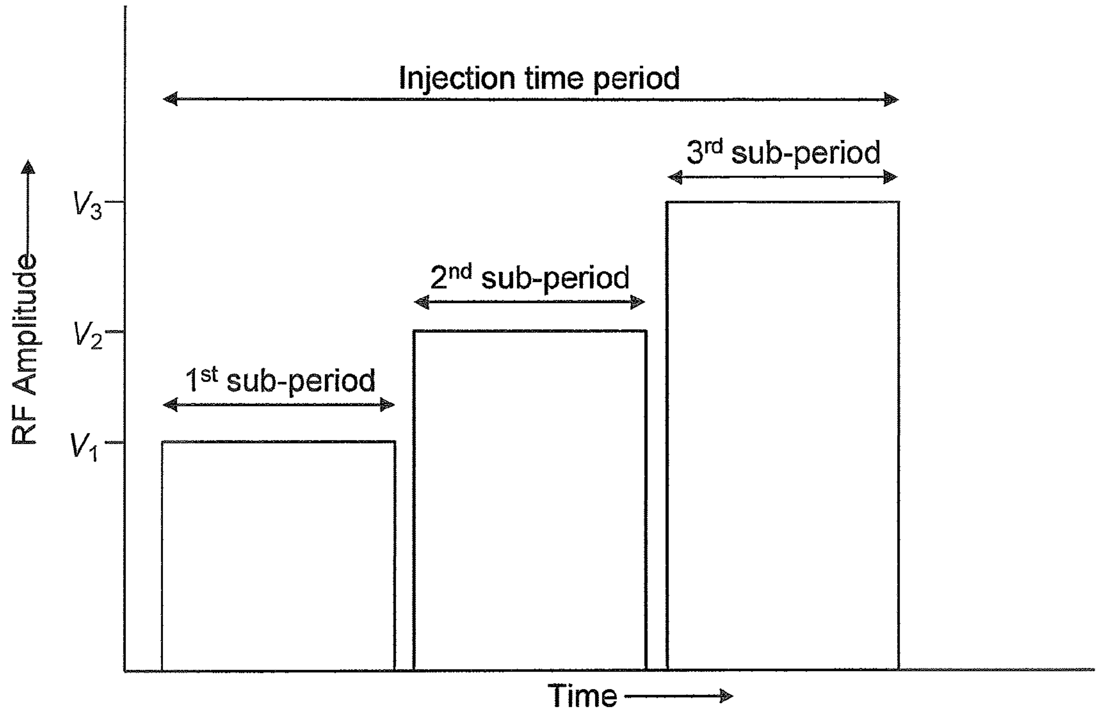
FIG. 4A (Prior Art)
FIG. 4A is a schematic depiction of the application of a stepped-amplitude RF voltage to the SRIG ion transport device of FIG. 2 according to a mode of operation intended to reduce m/z-discrimination during an injection period for a full scan mass spectrum.

In a related implementation, the injection time period is divided into a plurality of component sub-periods, which may or may not be of equal duration, and RF voltages of differing amplitudes are applied to the ion transport device during each of the sub-periods. In some embodiments, the RF voltage may be removed during the intervals between consecutive injection sub-periods. FIG. 4A depicts an example of the variation of RF amplitude with time during an injection period, for example corresponding to the accumulation period of an ion trap mass analyzer. In this example, the injection period is divided into three component sub-periods, whereby the RF voltage is applied in three consecutive steps of increasing amplitude. In the case of a mass spectrometer utilizing a SRIG, the RF amplitude A applied to the ring electrodes may be stepped over three values during the injection period according to the following equations:

$$A_1=K\sqrt{(m/z)_{low}} \quad \text{Eq. 1}$$

$$A_2=K\sqrt{(m/z)_{low}+c[(m/z)_{high}-(m/z)_{low}]} \quad \text{Eq. 2}$$

$$A_3=K\sqrt{(m/z)_{high}} \quad \text{Eq. 3}$$

wherein $A_1$, $A_2$ and $A_3$ are, respectively, the amplitudes of the applied oscillatory voltages at the first, second and third steps, $(m/z)_{low}$ and $(m/z)_{high}$ are, respectively, low and high ionic mass-to-charge ratios either within or defining the mass-to-charge range of interest, c is a constant with the constraint ($0 \le c \le 1$) that may take, for example, the value of 0.3, and K is a user-supplied or automatically selected scaling parameter such that ($0 < K \le 10$), with typical values between 3 and 7. The RF amplitude is held at three values ($A_1$, $A_2$ and $A_3$, respectively) for periods of equal duration which together span the entire injection period.

Figure 4B:
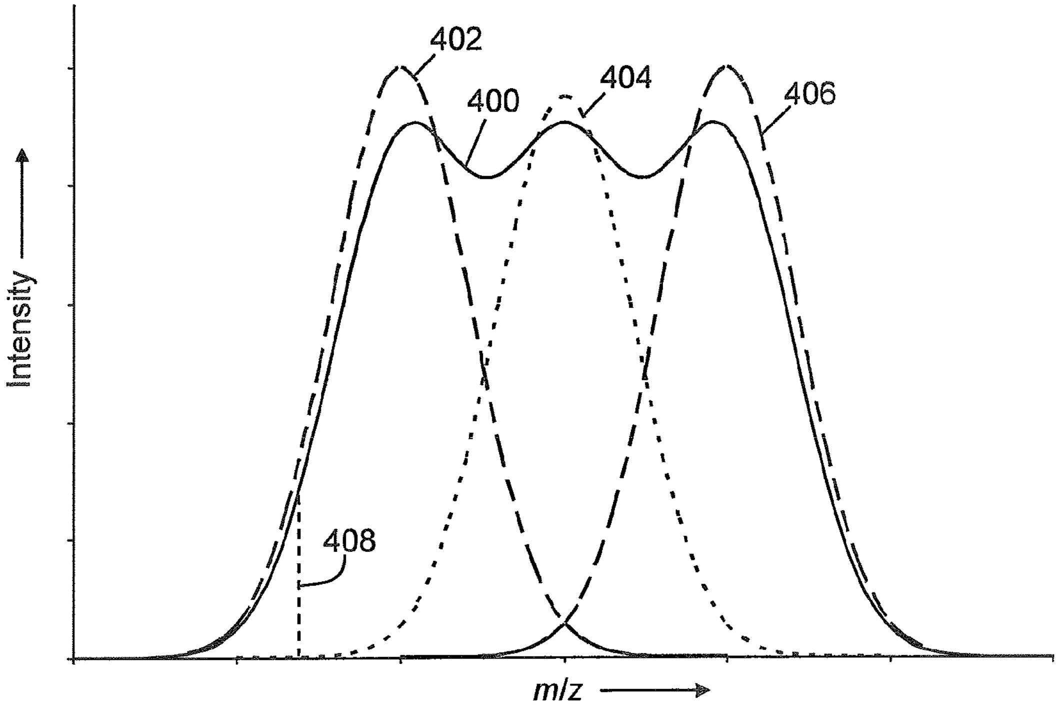
FIG. 4B is a schematic depiction of the mass-to-charge-dependent ion transmission through the SRIG ion transport device of FIG. 2 during each of the sub-periods illustrated in FIG. 4A and for the complete application of all three sub-periods.

By varying the maximum ion transmission efficiency over a range of m/z's, the resultant ion population accumulated within the mass analyzer may more closely approximate the population of ions produced at the source, without the undesirable discrimination against high or low m/z ions that would occur if the amplitude of the RF voltage applied to the ion transport device electrodes is maintained at a fixed value throughout the injection period. This effect is illustrated in FIG. 4B, which includes schematic depictions (i.e., curves 402, 404 and 406) of the mass-to-charge-dependent ion transmission through the SRIG ion transport device 105 of FIGS. 1A, 1B and 2 during each of the component sub-periods of FIG. 4A as well as a schematic depiction (e.g., curve 400) of the overall transmission through the device under the combined effects of the voltage steps applied during the totality of the injection period. Thus, a relatively flat-topped overall ion transmission curve may be obtained through proper choice of RF-voltage amplitudes and time durations of the various injection sub-periods illustrated in FIG. 4A. The transmission curve 400 is generally more suitable for use during a full scan mass analysis including those which are prior to a data dependent $MS^n$ scan.

Although FIGS. 4A and 4B and the accompanying text depict and describe the application of the RF voltage in a progressively increasing fashion, it should be recognized that the voltage steps can be applied in any order. Furthermore, as used herein, the terms first, second and third should not be construed as requiring a specific temporal sequence for applying the RF voltages, but instead are used simply to denote and distinguish different values of RF amplitudes. The voltage need not be applied in discrete steps as shown, but could vary in a continuous fashion during an injection period. If discrete voltage steps are employed, their number need not be constrained to three—any number of such steps could be employed.

In practice, a user may specify a value, k (instead of a value for K), which is related to K by a factor. For example, a user may specify a value of k as a percentage—that is to say, a value between 0 and 100. In such a case, K is simply calculated as K=k/10. The values of $(m/z)_{low}$, $(m/z)_{high}$ and K may be supplied by the instrument operator via a graphical user interface or may alternatively be selected by an instrument controller in accordance with stored criteria.

Since the relatively flat-topped transmission curve 400 is optimized for a full-scan mass analysis, efficiency considerations will generally dictate that, once a particular ion is selected for isolation as part of a subsequent $MS^n$ analysis, the transmission through a SRIG ion transport device (or other ion optical component having mass-to-charge-dependent transmission characteristics) will be optimized for transmission of the selected ion. For instance, a particular ion of interest may occur at the position of the vertical dashed line 408 in FIG. 4B. Let the mass-to-charge ratio of this ion be denoted as $(m/z)_{408}$. Clearly, the transmission curve 400 is not generally optimal for transmitting the selected ions corresponding to $(m/z)_{408}$ into an accumulator or mass analyzer. Instead, the RF voltage amplitude, $A_{408}$, that provides the optimal transmission of the selected ions, when applied to the SRIG during injection of ions, is given according to the equation:

$$A_{408}=K\sqrt{(m/z)_{408}} \quad \text{Eq. 4.}$$

Application of a single RF voltage to the SRIG ion transport device in a single step, wherein the RF voltage amplitude is $A_{408}$, as given above, will yield an ion transmission curve with a peak maximum centered at $(m/z)_{408}$. Although application of this RF voltage will enable the selected ions to be accumulated in a shorter injection time, the prior predictive AGC techniques will not yield the correct injection time, in this instance, because the injection conditions are not identical between the injection of ions for a full scan and for a subsequent data-dependent scan for this m/z. The determination of the correct ion injection is discussed below in conjunction with the method 500 shown in FIG. 5.

Figure 5:
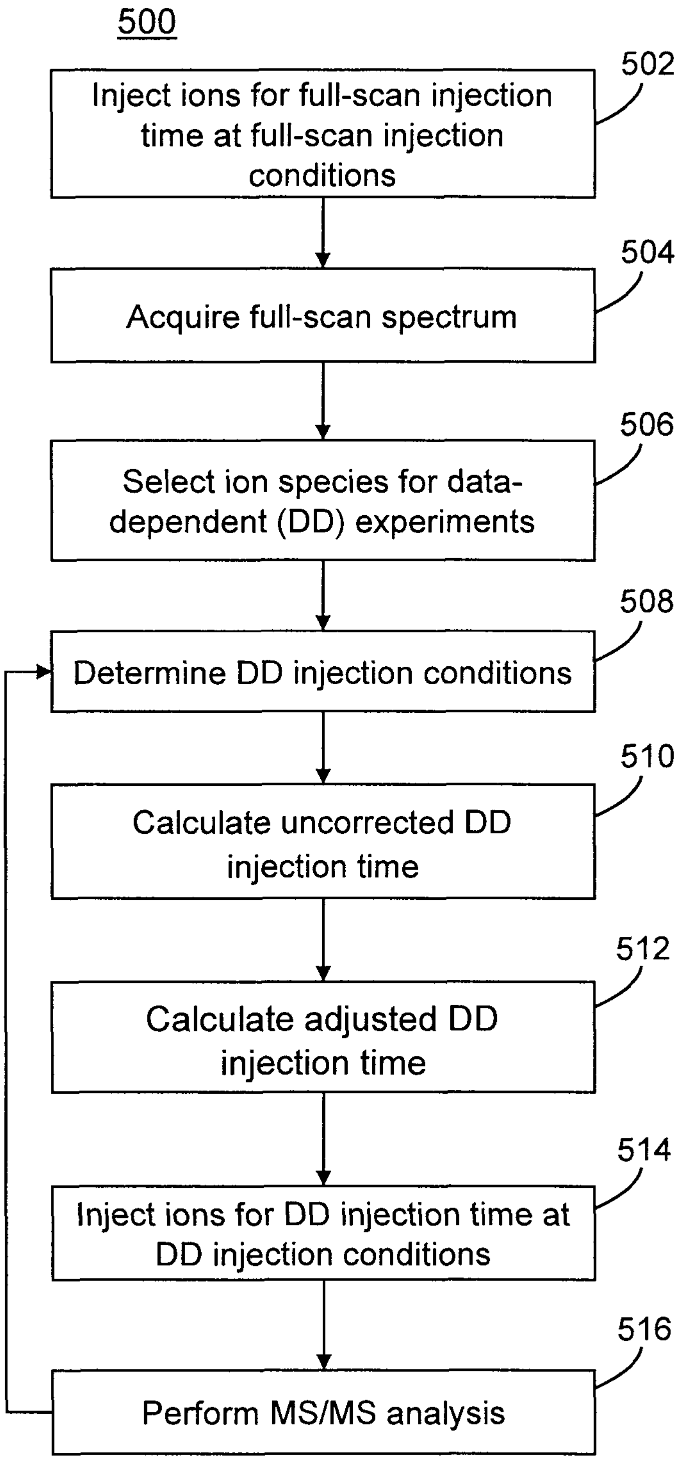
FIG. 5 is a diagram of a method in accordance with the present teachings.

The steps of a method 500 for operating a mass spectrometer in accordance with an embodiment of the invention are depicted in FIG. 5. In the initial step 502, ions are injected into an ion accumulator, ion trap or mass analyzer at a first set of injection parameters (the full-scan injection parameters) for a predetermined full-scan injection time. The full-scan injection time may be determined using the ion flux measured from a prior pre-scan and the target number of ion charges, as discussed in U.S. Pat. No. 5,572,022. For the full-scan injection, the injection parameters may be selected to provide a relatively flat transmission curve over the m/z range of interest for a system having mass-to-charge-dependent transmission characteristics, as shown in FIG. 4B and discussed above in reference thereto. Following injection, the ions are mass-sequentially scanned out of the ion accumulator or trap or mass analyzer to a detector to acquire a full-scan mass spectrum, step 504. In step 506, one or more ion species are selected for data-dependent (e.g., MS/MS) analysis based on the application of pre-specified criteria to the mass spectrum, for example, the ion species having the most intense peak(s) in the spectrum may be selected. The selected species (the identity of which need not be known prior to the measurement) may, for example, be a predetermined species, the most abundant species, the most abundant species from a predetermined list of species, or the most abundant species that is not on a predetermined list of species. The species may be selected automatically—such as, for instance, by execution of computer readable instructions in the electronics/processing unit 240 or in the electronics/processing unit 265—since there is frequently insufficient time available during an analysis for a human operator to make such selection. The injection parameters to be utilized for the data-dependent (DD) experiment (other than injection time, which is calculated in a different step) are then determined based on the m/z of the selected ion species, typically to optimize its transmission efficiency, step 508. In the current example, the RF voltage amplitude, $A_s$, to be applied to the SRIG during injection of ions for the data-dependent experiment is calculated according to the equation:

$$A_S=K\sqrt{(m/z)_S} \quad \text{Eq. 5}$$

where $(m/z)_S$ is the mass-to-charge ratio of the selected ion species.

Next, in step 510 of the method 500, the uncorrected data-dependent injection time, $t_{unc}$, is calculated from the intensity of the peak corresponding to the selected ion species in the full-scan mass spectrum and the full-scan injection time. Examples of this calculation are described in the aforementioned U.S. Pat. No. 7,312,441. As discussed above, such calculations do not take into account the difference in injection conditions between the full-scan and data-dependent experiments, and hence may tend to overestimate the injection time required to fill the ion trap with an optimal number of the selected ions, thereby leading to undesirable space charge effects. To correct for the difference in injection efficiency arising from the different injection conditions, the uncorrected data-dependent injection time is adjusted according to a factor, f, representative of the expected differential injection efficiency, in step 512. In the present example, the adjusted data-dependent injection time $t_{adj}$ is calculated according to the equation:

$$t_{adj}=t_{unc}/f \qquad \text{Eq. 5}$$

where $t_{unc}$ is the uncorrected injection time calculated in step 510 and f is a correction factor that is an empirically-determined function of the m/z of the selected ion species and the value of K. The empirically-determined function may be determined for a particular instrument by a calibration procedure in which the injection efficiencies for each of a plurality of calibrant ions (preferably having a range of mass-to-charge ratios that spans the range of interest) are measured when the SRIG is operated in full-scan mode (i.e., where the RF voltage amplitude is stepped during injection to yield a flat transmission curve) and in data-dependent mode (where the amplitude is optimized for transmission of the calibrant ion). This function may then be stored in the memory of the mass spectrometer or a computer associated therewith so that the value of the correction factor, f, may be quickly determined from the instrumental K value and the m/z of the selected ion.

Figure 6:
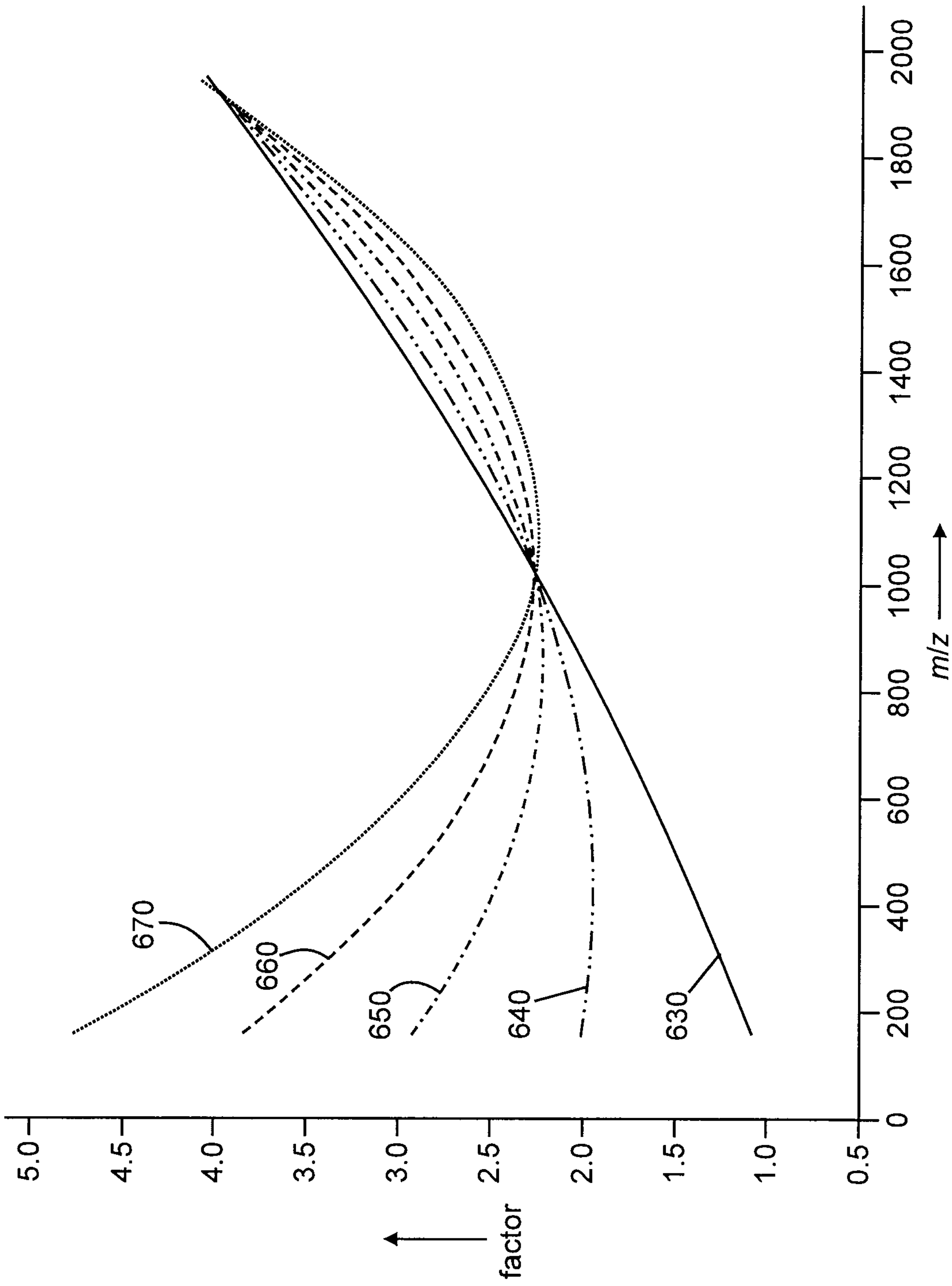
FIG. 6 is a graph of an injection-time correction factor in accordance with the present teachings empirically determined as a function of the m/z of the selected ion species and for several different values of an instrumental scaling factor.

FIG. 6 is a graph showing an example of how the correction factor, f, may vary with m/z and K (which together determine the RF amplitude applied to the ring electrodes during data-dependent injection) in a particular instrument. In this figure, the curves 630, 640, 650, 660, and 670 correspond to K values of 3, 4, 5, 6 and 7, in units of $V_{p-p}\,Da^{-1/2}$, respectively. Those skilled in the art will appreciate that certain implementations of the invention may utilize a correction factor that is a function of a greater number of parameters that affect the differential injection efficiency, including but not limited to tube lens voltage, RF and/or DC voltages applied to ion guide electrodes, and various parameters characterizing injection conditions applied to electrodes of the ion trap.

Following the calculation of the adjusted data-dependent injection time $t_{adj}$, the ion trap is filled, in step 514, with ions for a time period, $t_{adj}$, using the injection parameters determined in step 512. Adjustment of the injection time for differential injection efficiency ensures that the trap is not overfilled. The ions accumulated in the trap may then be subjected to MS/MS (or $MS^n$) analysis via one or more stages of isolation and dissociation, in step 516. Steps 508-516 may then be repeated for each of the ion species selected for data-dependent experiments in step 506.

It is to be understood that while the invention has been described in conjunction with the detailed description thereof, the foregoing description is intended to illustrate and not limit the scope of the invention, which is defined by the scope of the appended claims. Those skilled in the art will, of course, be able to combine the features explained on the basis of the various exemplary embodiments and, possibly, will be able to form further exemplary embodiments of the invention. Other aspects, advantages, and modifications are within the scope of the following claims.

What is claimed is:

1. A method for operating a mass spectrometer having an ion source, an ion accumulator and at least one ion transport device therebetween having an ion transmission efficiency that is generally non-constant with respect to ionic mass-to-charge-ratio (m/z ratio) comprising:

(a) transporting a first sample of ions having a range of m/z ratios through the ion transport device and into the ion accumulator for a first injection time under first operating conditions of the ion transport device, the first operating conditions chosen so as to at least partially counteract the non-constancy of ion transmission efficiency such that an accumulated population of ions transported into the ion accumulator substantially approximates a population of ions produced by the ion source within the range of m/z ratios;

(b) acquiring a full-scan mass spectrum of the first sample of ions;

(c) selecting, based on the full-scan mass spectrum, an ion species having a species m/z ratio and corresponding to a mass spectrum peak intensity within the full-scan mass spectrum;

(d) calculating a second injection time for transporting a population of the selected ion species through the ion transport device and into the ion accumulator under second operating conditions of the ion transport device, the second operating conditions different from the first operating conditions and chosen such that transmission efficiency through the ion transport device at the species m/z ratio is greater under the second operating conditions than under the first operating conditions, wherein the calculating is based on the first injection time, the peak intensity, a target value for a number of ion charges in the ion accumulator and a predetermined correction factor;

(e) transporting a second sample of ions having the selected ion species from the ion source through the ion transport device and into the ion accumulator for the second injection time under the second operating conditions of the ion transport device; and (f) acquiring a mass spectrum of ions derived from the selected ion species in the mass spectrometer.

2. A method as recited in claim 1, wherein the step (a) of transporting the first sample of ions having a range of m/z ratios through the ion transport device and into the ion accumulator for the first injection time under the first operating conditions of the ion transport device comprises transporting the first sample of ions through a stacked-ring-ion-guide (SRIG) ion transport device, the SRIG ion transport device operated such that a plurality of RF voltage amplitudes are applied sequentially in time to ring electrodes of the SRIG ion transport device during the transporting of the first sample of ions.

3. A method as recited in claim 2, wherein the plurality of RF voltage amplitudes includes a first amplitude, $A_1$, calculated as $A_1=K\sqrt{(m/z)_{low}}$ and a second amplitude, $A_3$, calculated as $A_3=K\sqrt{(m/z)_{high}}$, wherein $(m/z)_{low}$ and $(m/z)_{high}$ are, respectively, low and high ionic mass-to-charge ratios and K is a user-supplied or automatically selected scaling parameter such that $(0<K<10)$.

4. A method as recited in claim 3, wherein the step (e) of transporting the second sample of ions having the selected ion species through the ion transport device and into the ion accumulator for the second injection time under the second operating conditions of the ion transport device comprises transporting the second sample of ions through the stacked-ring-ion-guide (SRIG) ion transport device, the SRIG ion transport device operated such that a single RF voltage amplitude is applied to the ring electrodes of the SRIG ion transport device during the transporting of the second sample of ions.

5. A method as recited in claim 4, wherein the single RF voltage amplitude, $A_S$, is calculated as $A_S=K\sqrt{(m/z)_S}$, where $(m/z)_S$ is the mass-to-charge ratio of a selected ion species.

6. A method as recited in claim 5, wherein the pre-determined correction factor varies according to $(m/z)_S$.

7. A method as recited in claim 6, wherein the pre-determined correction factor further varies according to the scaling parameter, K.

8. A method as recited in claim 3, wherein the plurality of RF voltage amplitudes includes an amplitude, $A_2$, calculated as $A_2=K\sqrt{(m/z)_{low}+c[(m/z)_{high}-(m/z)_{low}]}$ wherein c is a constant such that $(0<c<1)$.

9. A method as recited in claim 3, wherein $(3<K<7)$.

10. A method as recited in claim 1, wherein the step (e) of transporting the second sample of ions having the selected ion species through the ion transport device and into the ion accumulator for the second injection time under the second operating conditions of the ion transport device comprises transporting the second sample of ions through a stacked-ring-ion-guide (SRIG) ion transport device, the SRIG ion transport device operated such that a single RF voltage amplitude is applied to ring electrodes of the SRIG ion transport device during the transporting of the second sample of ions.

11. A method as recited in claim 10, wherein the single RF voltage amplitude, $A_S$, is calculated as $A_S=K\sqrt{(m/z)_S}$, where $(m/z)_S$ is the mass-to-charge ratio of a selected ion species and K is a user-supplied or automatically selected scaling parameter such that $(0<K<10)$.

12. A method as recited in claim 11, wherein the pre-determined correction factor varies according to $(m/z)_S$.

13. A method as recited in claim 12, wherein the pre-determined correction factor further varies according to the scaling parameter, K.

14. A method as recited in claim 11, wherein $(3<K<7)$.

15. A method as recited in claim 1, wherein the step (f) of acquiring a mass spectrum of ions derived from the selected ion species in the mass spectrometer comprises performing MS/MS analysis.

16. A mass spectrometer system comprising:

(i) an ion source for providing ions;

(ii) an ion accumulator for storing, fragmenting or analyzing ions provided by the ion source, the ion accumulator having an ion detector;

(iii) an ion transport device disposed between the ion source and the ion accumulator for transporting ions from the ion source to the ion accumulator, the ion transport device having efficiency of ion transmission therethrough that is generally non-constant with respect to ionic mass-to-charge ratio (m/z ratio); and (iv) an electronic processing and control unit electronically coupled to the ion accumulator and the ion transport device, the electronic processing and control unit configured to:

(a) cause the ion transport device to transport a first sample of ions having a range of m/z ratios from the ion source into the ion accumulator for a first injection time under first operating conditions of the ion transport device, the first operating conditions chosen so as to at least partially counteract the non-constancy of ion transmission efficiency through ion transport device such that an accumulated population of ions transported into the ion accumulator substantially approximates a population of ions produced by the ion source within the range of m/z ratios;

(b) cause the ion accumulator and detector to acquire a full-scan mass spectrum of the first sample of ions;

(c) select, based on the full-scan mass spectrum, an ion species having a species m/z ratio and corresponding to a mass spectrum peak intensity within the full-scan mass spectrum;

(d) calculate a second injection time, the second injection time for transporting a population of the selected ion species through the ion transport device and into the ion accumulator under second operating conditions of the ion transport device, the second operating conditions different from the first operating conditions and chosen such that transmission efficiency through the ion transport device at the species m/z ratio is greater under the second conditions than under the first operating conditions, wherein the calculating is based on the first injection time, the peak intensity, a target value for a number of ion charges in the ion accumulator and a predetermined correction factor;

(e) cause the ion transport device to transport a second sample of ions having the selected ion species from the ion source into the ion accumulator for the second injection time under the second operating conditions of the ion transport device; and (f) cause the ion accumulator and detector to acquire a mass spectrum of ions derived from the selected ion species in the mass spectrometer.

17. A mass spectrometer system as recited in claim 16, wherein the ion transport device comprises a stacked ring ion guide.

18. A mass spectrometer system as recited in claim 17, wherein the first operating conditions are such that a plurality of RF voltage amplitudes are applied sequentially in time to ring electrodes of the stacked ring ion guide during the transporting of the first sample of ions.

19. A mass spectrometer system as recited in claim 18, wherein the second operating conditions are such that a single RF voltage amplitude is applied to ring electrodes of the stacked ring ion guide during the transporting of the second sample of ions.

20. A mass spectrometer system as recited in claim 16, wherein the ion transport device is disposed within a first vacuum chamber wherein the operating pressure is in the range of 1-10 Torr and wherein an operating pressure within the ion accumulator is less than the pressure within the first vacuum chamber.

* * * * *